(12) United States Patent
Donohoe

(10) Patent No.: US 7,114,463 B2
(45) Date of Patent: Oct. 3, 2006

(54) ARTICLES FOR ENHANCING THE ENVIRONMENT OF CONTAINED ANIMALS

(76) Inventor: Jerome L. Donohoe, 2020 N. 53rd St., Milwaukee, WI (US) 53208

(*) Notice: Subject to any disclaimer, the term of this patent is extended or adjusted under 35 U.S.C. 154(b) by 0 days.

(21) Appl. No.: 10/416,045

(22) PCT Filed: Nov. 5, 2001

(86) PCT No.: PCT/US01/46815

§ 371 (c)(1),
(2), (4) Date: Sep. 17, 2003

(87) PCT Pub. No.: WO02/36040

PCT Pub. Date: May 10, 2002

(65) Prior Publication Data

US 2004/0055542 A1    Mar. 25, 2004

Related U.S. Application Data

(60) Provisional application No. 60/245,511, filed on Nov. 3, 2000.

(51) Int. Cl.
*A01K 1/03* (2006.01)

(52) U.S. Cl. .................. 119/472; 119/417; 119/706

(58) Field of Classification Search ............. 119/472, 119/467, 462, 477, 454, 417, 421, 422, 702, 119/705, 706, 246, 247, 248, 251, 252; 220/4.26; 206/499, 503, 505, 506, 514, 515
See application file for complete search history.

(56) References Cited

U.S. PATENT DOCUMENTS

| | | | | | |
|---|---|---|---|---|---|
| 2,306,014 | A | * | 12/1942 | Carson | 119/161 |
| 2,971,493 | A | * | 2/1961 | Robb | 119/166 |
| 3,141,442 | A | * | 7/1964 | Harris | 119/246 |
| 3,343,520 | A | * | 9/1967 | Schwarz, Jr. | 119/419 |
| 3,381,663 | A | * | 5/1968 | Dayton | 119/452 |
| 3,712,267 | A | * | 1/1973 | Moliterni | 119/464 |
| 3,762,369 | A | * | 10/1973 | Barnum | 119/161 |
| 3,796,188 | A | * | 3/1974 | Bradstreet | 119/166 |
| 3,885,523 | A | * | 5/1975 | Coleman | 119/165 |
| 3,990,397 | A | * | 11/1976 | Lowe, Jr. | 119/165 |
| 4,347,807 | A | * | 9/1982 | Reich | 119/499 |
| 4,359,837 | A | * | 11/1982 | Hool | 446/171 |
| 4,627,383 | A | * | 12/1986 | Metzger | 119/161 |
| 4,640,228 | A | * | 2/1987 | Sedlacek et al. | 119/419 |
| 4,667,622 | A | * | 5/1987 | Breault | 119/165 |
| 4,677,938 | A | * | 7/1987 | Tominaga | 119/421 |
| 4,820,556 | A | * | 4/1989 | Goldman et al. | 428/7 |
| 4,828,112 | A | * | 5/1989 | Vollrath et al. | 206/519 |
| 4,967,908 | A | * | 11/1990 | Kessler | 206/518 |
| 5,054,427 | A | * | 10/1991 | Hoover | 119/452 |
| 5,088,446 | A | * | 2/1992 | Campiotti | 119/421 |
| 5,195,454 | A | * | 3/1993 | Wadell | 118/16 |
| 5,361,725 | A | * | 11/1994 | Baillie et al. | 119/165 |
| 5,456,208 | A | * | 10/1995 | Choenchom | 119/452 |

(Continued)

*Primary Examiner*—Yvonne R. Abbott
(74) *Attorney, Agent, or Firm*—Godfrey & Kahn, S.C.

(57) ABSTRACT

An enrichment article for animals. The article generally includes a platform that is suspended from the floor of a cage or other containment. The article may be a tray having a flange for suspension from the walls of a container. The platform bottom may have an opening for animal access. This article may be truncated so that is fits in one portion of the base, or may have separate compartments to accommodate not only animals, but food and or water.

35 Claims, 5 Drawing Sheets

U.S. PATENT DOCUMENTS

| | | | | |
|---|---|---|---|---|
| 5,511,511 | A * | 4/1996 | Voren | 119/464 |
| 5,598,810 | A * | 2/1997 | Lawton, III | 119/166 |
| 5,694,885 | A * | 12/1997 | Deitrich et al. | 119/477 |
| 5,881,676 | A * | 3/1999 | Brown et al. | 119/452 |
| 5,893,336 | A * | 4/1999 | Vice et al. | 119/166 |
| 5,894,816 | A * | 4/1999 | Coiro et al. | 119/417 |
| 5,964,189 | A * | 10/1999 | Northrop et al. | 119/482 |
| 5,975,024 | A * | 11/1999 | Sheaffer | 119/477 |
| 6,029,605 | A * | 2/2000 | Licata | 119/246 |
| 6,029,606 | A * | 2/2000 | Youngstrom et al. | 119/246 |
| 6,318,295 | B1 * | 11/2001 | Wade | 119/500 |
| 6,431,119 | B1 * | 8/2002 | Beymer | 119/485 |
| 6,474,262 | B1 * | 11/2002 | Ceccon | 119/166 |
| 6,487,989 | B1 * | 12/2002 | Yamamoto | 119/161 |
| 6,532,899 | B1 * | 3/2003 | Hootman | 119/253 |
| 6,615,765 | B1 * | 9/2003 | Thomas | 119/165 |
| 6,851,388 | B1 * | 2/2005 | Vaccari et al. | 119/452 |
| 2005/0066908 | A1 * | 3/2005 | Park | 119/419 |
| 2005/0066909 | A1 * | 3/2005 | Gabriel et al. | 119/419 |
| 2005/0115516 | A1 * | 6/2005 | Marchioro | 119/705 |

\* cited by examiner

ARTICLES FOR ENHANCING THE ENVIRONMENT OF CONTAINED ANIMALS

CROSS REFERENCE TO RELATED APPLICATIONS

This application is a national stage application under 37 CFR § 371 of International Patent Application No. PCT/US01/46815, filed on Nov. 5, 2001, which claims the benefit of U.S. Provisional Application No. 60/245,511, filed on Nov. 3, 2000.

FIELD OF THE INVENTION

This invention relates generally to articles used to enrich the environment of confined animals, and in particular, to devices that permit confined animals to move off the floor of an animal housing unit.

BACKGROUND OF THE INVENTION

In certain industries, animals are necessarily contained in ventilated or unventilated housings, cages or other shelters so that researchers can study the animal's condition due to disease, drug studies, genetic changes, etc. It is important in some industries, such as the biomedical industry, that protocols be strictly adhered to. This is one reason why it is necessary to contain animals that are subjected to research. Any variation through outside factors, including environmental threats, must be accounted for and will sometimes require repeating of a research experiment. This replication increases the cost of the experiment, both in animal waste and labor inefficiencies that can be deducted from the cost of the research grant.

Often, the animals used are extremely valuable because of their genetic makeup and the length of time required to bring the animal to the point of the protocol definition. Some research animals can be worth several hundred thousand dollars each. Thus, it is not only necessary to preserve the research animal's quality of life for humane reasons, it is necessary for economic reasons as well as required by government regulations. Only a certain amount of money is available for AIDS research, cancer research and the like, and it must be used responsibly.

Part of using research money responsibly is in treating research animals responsibly. Contained animals need clean bedding and a clean source of food and drinking water at all times. This preserves the animal's health and removes factors that can vary research results. It is generally unsanitary to simply provide animals with food and water dishes because some animals will indiscriminately urinate or defecate in the dish before eating or drinking from it. Therefore, it is typical to provide drinking water to research animals through food containers, water bottles or automatic watering systems that do not require dishes. These systems typically consist of receptacles, valves or lick spouts that supply each shelter.

Though there is a growing demand for improved animal housing, there is also a shortage of labor to maintain the protocol required for housing conditions. Unfortunately, not all animals are under constant human surveillance. Sometimes, the water bottles or automatic watering systems fail and flooding of the animal's shelter occurs within minutes. When this happens, the shelter can fill with water to the point where the animal becomes hypothermic or drowns. This type of occurrence not only has inhumane results, but can be devastating for the outcome of the research project. Literally millions of research dollars can be wasted along with the animal's life.

While there exists various types of apparatuses for animals to reside and play on in confined spaces, such as suspended tubes or swings, these prior devices are not adequate for escaping flood or unsanitary bedding conditions within the shelter. For instance, tubes are restrictive in that they do not allow that animal to move about in the same manner as they move when on the floor of the shelter. Such devices are simply too small for the animal to comfortably reside in for extended periods of time. Furthermore, tubes are hard to clean and cannot be stacked when in storage.

Thus, there is a need for an article that can allow a contained animal to remove itself from the dangers of unsanitary cage conditions such as hypothermia or drowning in the case of a watering system failure, and even improve the quality of life for a contained animal.

SUMMARY OF THE INVENTION

The present invention is generally an article having a platform on which an animal can comfortably reside. The article is selectively placed within the animal's shelter not only to increase the safety of the shelter, but also provide a new living area in previously unavailable open space.

In one aspect of the present invention, the article can be described as a tray that occupies the entire top portion of a base used to contain animals, the base having a removeable lid. The tray is a platform with four walls extending upwardly therefrom. A flange surrounds the perimeter of the walls and sits atop or within a rimmed lip on the base. The flange is such that the lid can be placed on the base without disrupting any microbial filter or solid top that may be included in the lid. An opening in the platform allows animals to gain entry to the article.

In another embodiment of the present invention, the article is truncated so that it occupies only a portion of the base. There may be two, three or four walls surrounding the platform. If there are four walls, there is an opening in one wall or the platform so an animal can gain entry to the article.

In yet another embodiment of the present invention, the article is not truncated, but has two separated compartments. One compartment may be used to contain a supply of food and/or water, and the other compartment for animal living space or both compartments may be used for living with food and water supplied through other systems.

Advantageously, with any of the above articles, an animal can find refuge from undesirable environmental conditions occurring on the floor of the shelter in which it resides. Further, it increases the living space within the confines of an animal shelter, and improves a confined animal's quality of life. Preferably the articles of the present invention are made of a material that can be sanitized or made of a disposable material in conformance with industry and government regulatory standards.

There are other advantages associated with the use of the articles of the present invention. First, improvement of conditions for confined animals can serve to increase public acceptance of the use of animals in research or other industries where confinement is necessary. Second, in other industries such as the transport, pet, farming and veterinary industries, in addition to the potential avoidance of flooded areas or soiled bedding, the platform provides animals residing together with a means to separate from each other.

Third, the article can serve to reduce the amount of labor needed for maintaining an animal shelter.

These and other objectives and advantages are met by the articles of the present invention. The present invention will be better understood from the following detailed description of the invention, read in connection with the attached photographs.

DESCRIPTION OF THE PREFERRED EMBODIMENTS

Figure 1:
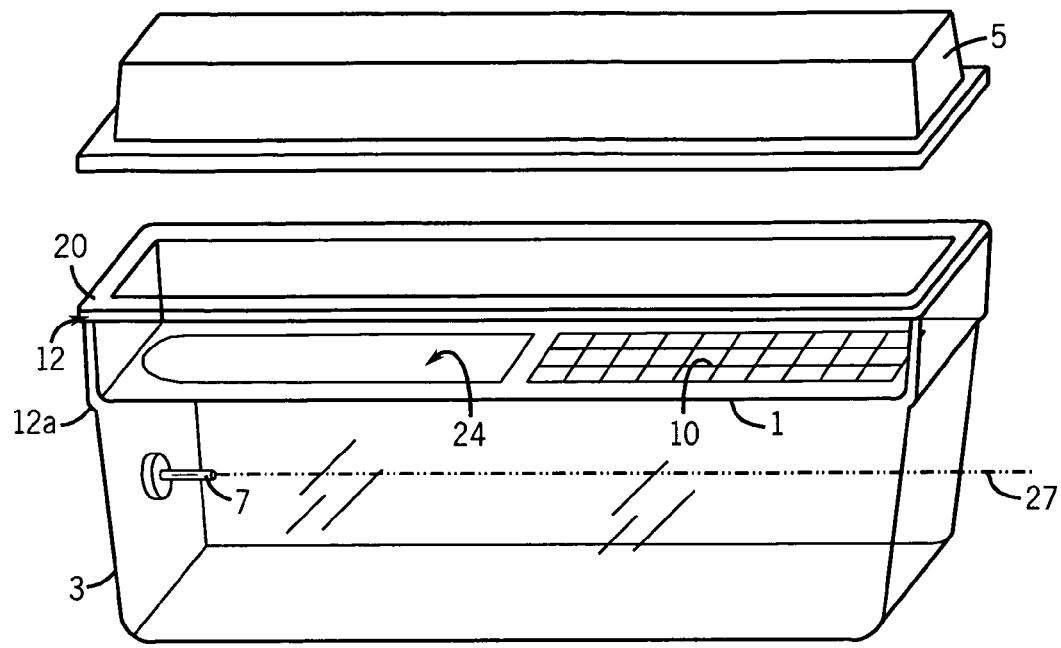
FIG. 1 is a side perspective view of the article of one embodiment of the present invention, situated in a base having a lid.

The article of the present invention is a platform that can be selectively positioned within an animal cage (i.e. wire, clear plastic or disposable material) or other shelter so that the animal can take refuge from undesirable environmental conditions occurring on the shelter floor and to enhance the quality of life. FIG. 1 shows the platform used in a cage specifically designed for small animals. However, the article can also be used in larger shelters. As seen in FIG. 1 these shelters typically consist of a base 3 and lid 5 (shown elevated above base 3) that is generally configured like a plastic shoe box. Lid 5 can be flat or propped up on one end of base 3. A water valve, air valve, food source apparatus or lick spout 7 is commonly introduced into the shelter on one side of base 3.

Article 1 is constructed from a platform 10 suspended from the side 12 or side 12a of base 3 to provide a stable place for an animal to vertically climb or jump onto and reside. Preferably, platform 10 is suspended by a frame formed from two, three or four side-walls 16 as seen in FIGS. 3–6. For reasons of added durability and strength, walls 16 are preferably joined at the corners 18 between each wall 16. Preferably, along the top of the walls 16 is a continuous flange 20 that rests along the rim or side-wall of the shelter base. Alternatively, one could suspend platform 10 by a flanged arm or arms (not shown), rather than a solid three- or four-sided wall. Either way, platform 10 is suspended so that it cannot fall off during normal use.

Preferably, article 1 is constructed from a material that can be sanitized as required by government regulations or constructed of disposable materials. This reusable material can be a metal such as stainless steel, or preferably, some type of plastic such as polycarbonate, ZYTEM™, or polyethylene. A disposable platform could be constructed from biodegradable or plastic materials. It is preferable that the material be lightweight, transparent, provide ease of manufacture, and be of relatively low cost. In some cases, it may also be desirable to use a material that dissipates heat at a lesser rate than metal wire to prevent the animal from becoming cold.

As seen in FIGS. 1–15, article 1 can be of a unitary construction (i.e. injection molded). Alternatively, platform 10 can be of multi-part construction (not shown) and later connected to the walls 16 or arms (not shown). For example, walls 16 may be a metallic material, and platform 10 may be plastic. Or, walls 16 and platform 10 can be made from the same material, but platform 10 can be separate and removable. Platform 10 and wall 16 could even be a disposable piece, and be manufactured from disposable materials such as polypropylene, polystyrene or others.

Figure 5:
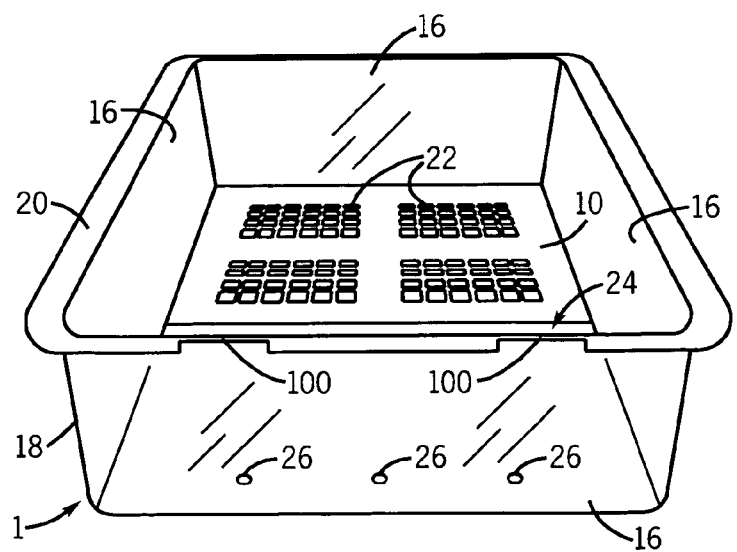
FIG. 5 in a front perspective view of the article shown in FIG. 4.

Regardless of whether article 1 is of unitary or separate construction, it is preferable that walls 16 or arms (not shown) are angled away from platform 10 so that it is easier to place within and remove article 1 in bases from various manufacturers. Further, as shown in FIG. 5, it is preferable to provide several bosses 26 on the surfaces or the corners on each wall 16 so that articles 1 do not stick together when stacked. The bosses 26 are preferably on the outer surface so the confined animal cannot chew on them.

In some instances, the article flange could be designed so that it reduces or substantially eliminates unfiltered air from entering the shelter. Unfiltered air may contain viral contaminants that can create a potentially life threatening situation for the animal or cause deviations from research protocols. For example, some manufacturers have designed the base 3 to fit a particular lid 5. In particular, some manufacturers have a stepped rim around the top of base 3 to accommodate a special filtered lid. In such instances, flange 20 may need to be designed specifically to fit a particular manufacturer's rim and lid so as not to disturb and possibly even improve the function of the filter by providing a better seal.

Preferably, walls 16 are of a height so that platform 10 is located at or above spout 7. In another embodiment (not shown), the platform 10 could be below spout 7, and the platform modified so that the animal can still drink or eat from the spout area 7. Because of the continuous water pressure used in most automatic watering systems, it is not likely that water levels would rise above spout 7. Therefore, if platform 10 is above the water level 27 (seen in FIG. 1), the animal will have a dry place of refuge if needed.

Figure 3:
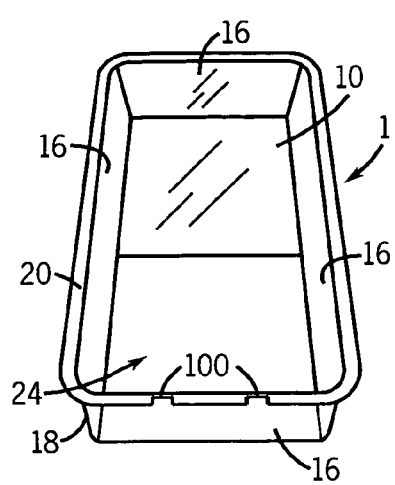
FIG. 3 is a top perspective view of yet another embodiment of the article shown in FIG. 1.
Figure 4:
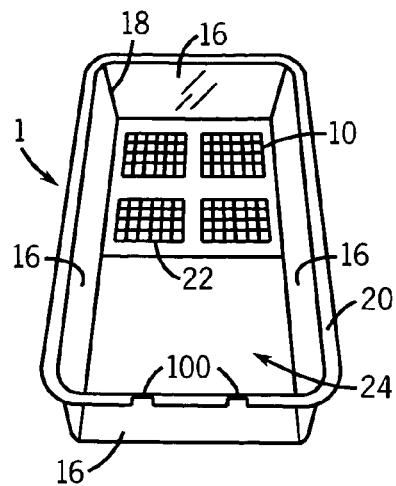
FIG. 4 is a top perspective view of the embodiment of the article shown in FIG. 1.
Figure 6:
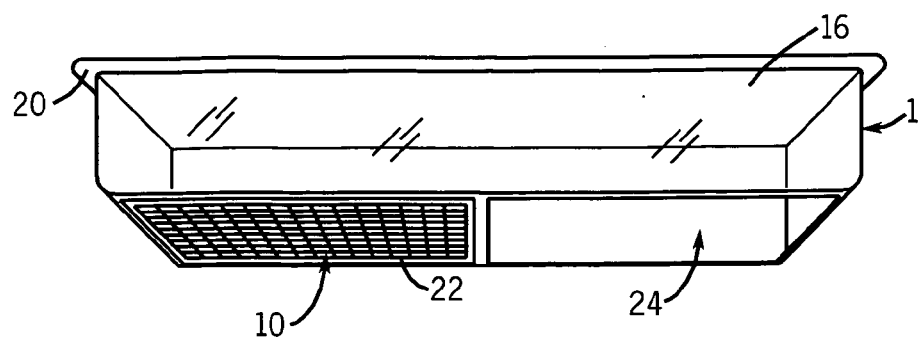
FIG. 6 is a bottom perspective view of the article shown in FIG. 4.

In addition, platform 10 preferably has rounded edges to deter chewing. Further, platform 10 may have a grid of openings 22 substantially covering platform 10 (as shown in FIGS. 4–6), may have a grid of openings 22 partially covering platform 10, or they may be omitted completely (as shown in FIG. 3). While the openings 22 may be desirable for ventilation in some shelters, a solid floor could provide better comfort for the animal.

The article shown in FIGS. 1–6 has four walls 16 with a continuous flange 20. Thus, it is necessary to provide an opening 24 for the animal to vertically climb or jump through.

Figure 7:
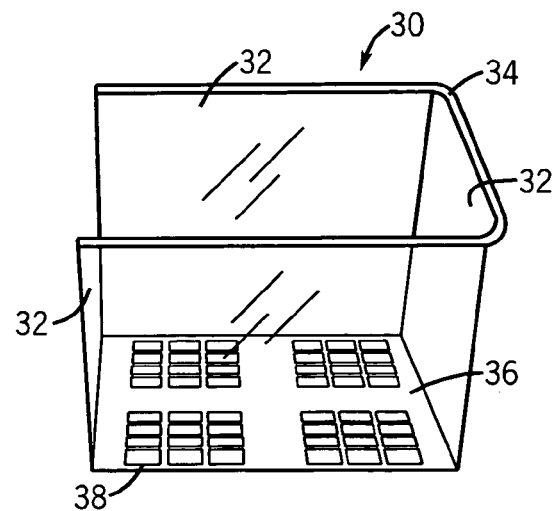
FIG. 7 is a side perspective view of an alternative embodiment of an article of the present invention.
Figure 8:
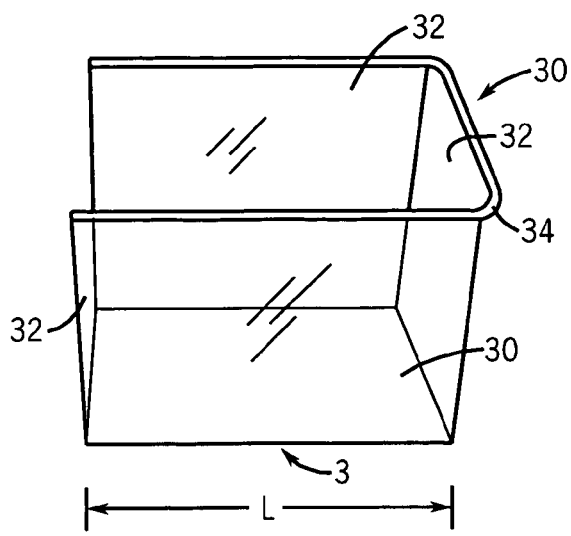
FIG. 8 is a side perspective view of a variation of the article shown in FIG. 7.

A second embodiment of the present invention is shown in FIGS. 7 and 8. This embodiment, referred to as article 30 is a truncated version of article 1. Instead having four walls, article 30 has three walls 32. As before, article 30 has a flange 34 at the top edge of each wall, with each wall 32 attached at a bottom edge to a platform 36. Platform 36 may be solid as shown in FIG. 8, or include a grid of openings 38 as shown in FIG. 7. Article 30 may be constructed from the same materials as article 1, and may have a removeable platform section (not shown) as described previously. Article 30 is dimensioned to fit a base 3, and has a length L that allows the animal living in base 3 to vertically jump or climb onto platform 36.

Figure 9:
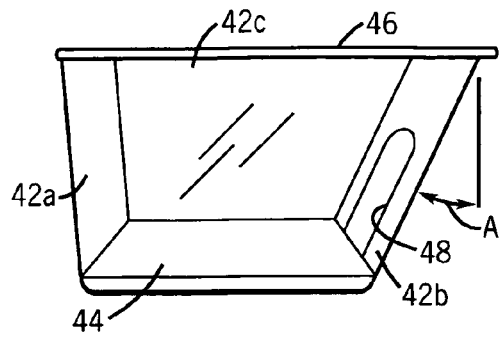
FIG. 9 is another embodiment of the article of the present invention.
Figure 10:
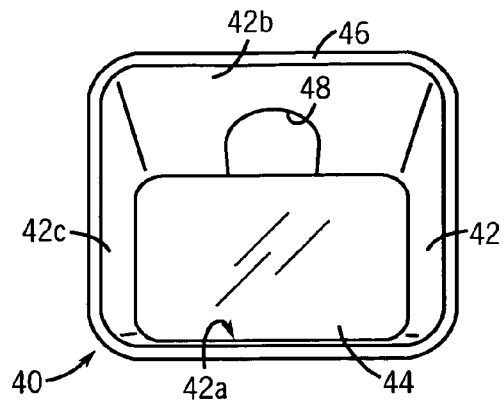
FIG. 10 a top perspective view of the article shown in FIG. 9.

A third embodiment is shown in FIGS. 9 and 10. The third embodiment comprises generally an article 40 that is truncated, and has four walls 42, a platform 44 and a continuous flange 46. Specifically, a rear wall 42a is located opposite a front wall 42b, and connected by side walls 42c. Preferably, the front and side walls 42b,c angle inwardly from flange 46 down to platform 44. This allows easy removal of article 40 from a base, such as base 3. Most preferably, the angle A at which front wall 42b is oriented is greater than that of sidewalls 42c. This allows the confined animal more room to stand while in the base, and more room to move about while on platform 44. An opening 48 is provided in front wall 42b so an animal can gain access to platform 44.

Figure 11:
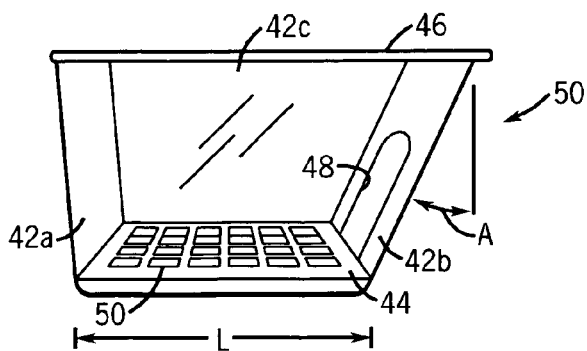
FIG. 11 is a side perspective view of a variation of the embodiment shown in FIG. 10.

A fourth embodiment is shown in FIG. 11. This embodiment, referred to as article 50, is identical to article 40 except it includes a grid of openings 52.

Figure 12:
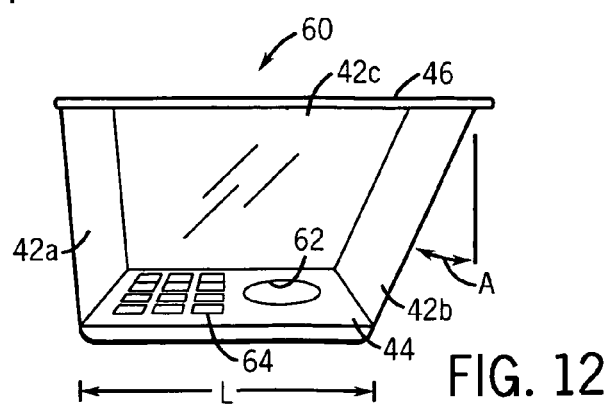
FIG. 12 is a side perspective view of another variation of the embodiment shown in FIG. 10.

A fifth embodiment is shown in FIG. 12, and is referred to as article 60. Article 60 is also identical to article 50 with two exceptions. First, opening 48 (FIG. 11) is replaced by an opening 62 in platform 44. Preferably, opening 62 is near one of the walls 42 so that the animal vertically climbing or jumping onto has enough floor space to land on. Further, the living space is more efficient if opening 62 is not centrally located in platform 44. The second exception is that grid 52 (FIG. 11) is replaced by a smaller grid 62. Alternatively, grid 62 may be omitted completely (not shown).

The embodiments described above as articles 40, 50 and 60 are constructed from the same materials as article 1, and may be unitary in construction or have a removeable platform section (not shown) as described previously. Articles 40, 50 and 60 are dimensioned to fit a base 3, and have a platform length L that allows the animal living in base 3 enough room to stand.

Figure 13:
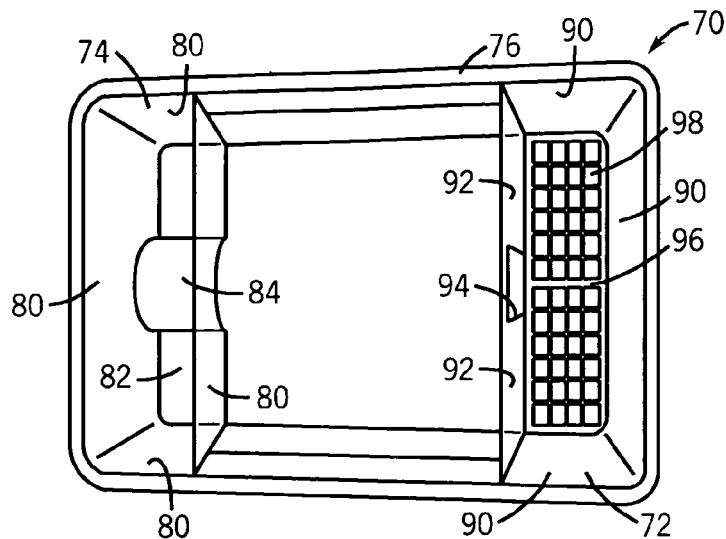
FIG. 13 is a top perspective view of yet another embodiment of the article of the present invention.
Figure 14:
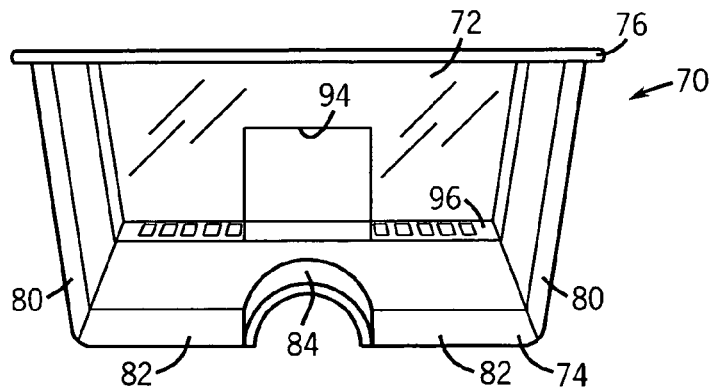
FIG. 14 is a front perspective view of the article shown in FIG. 13.
Figure 15:
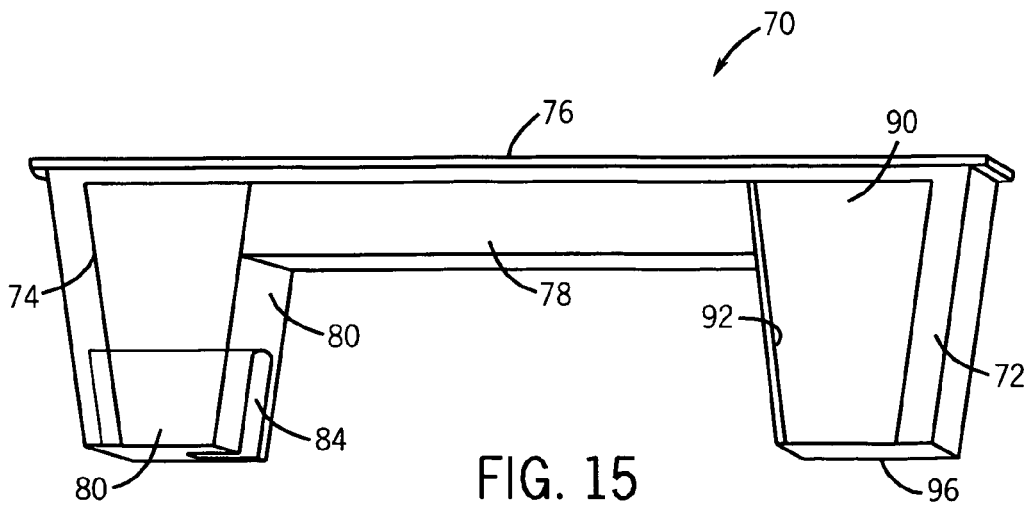
FIG. 15 is a side perspective view of the article shown in FIG. 13.

A sixth embodiment is shown in FIGS. 14–15, and will be referred to as article 70. Article 70 is a split design with two compartments, 72 and 74. As with article 1, a continuous flange 76 surrounds the top portion of article 70, and serves to connect compartments 72 and 74. A central ridge member 78 may be included for structural stability as seen in FIG. 15, or omitted as seen in FIGS. 13 and 14.

Compartment 74 is used to accommodate food or drink dispensers (not shown). Specifically, compartment 74 has four walls 80 and a floor section 82. Floor section 82 may include an arched portion 84 as shown, or may instead be flat. Arched portion 84 can be used to accommodate standard lick spouts, air spouts, food or drinking apparatuses (not shown) that may be included with the base. Of course, arch portion 84 may be of any size or shape, and is not necessarily located centrally on floor section 82. Further, one or more arch portions 84 may be used to separate compartment 74 so that a pair of food and/or drink dispensers can be placed therein. Openings (not shown) may be provided in floor section 82, walls 80 or the like to accommodate a device used on the food or drink dispensers, e.g. a lick spout or air spout.

Compartment 72 can be used as a living space by the confined animals. This space is defined by at least two or three walls 90, and preferably with a fourth inside wall 92. The fourth wall 92 may have an opening 94 therein for the animals to access compartment 72. Alternatively, there may be an opening (not shown) in the platform 96 or the fourth wall omitted (not shown). Platform 96 may include a grid of small openings 98 as shown, or may have a solid floor. As before, article 70 may be a unitary piece, or have separate components such as a removable platform 96. The materials used to construct article 70 are the same as that for article 1.

The flange 20, 34, 46 and 76 in all of the above articles is designed to ensure proper enclosure of the lid of a container, such as lid 5. The base and lid such as base 3 and lid 5 (shown in FIG. 1) may be designed so that when combined, only filtered air gains entry to the interior. Adding components having a proper flange, such as the articles described herein, will preferably not disturb this air filtration. Thus, as seen in FIGS. 3–5, notches 100 may be included above or below in flanges 20 as shown, or in the flanges 34, 46 and 76 of the other embodiments. Notches 100 provide exhaust air flow to the exterior of base 3 in a positive air pressurized cage system, and are positioned so that the air flow will pass out through the notches on the flange 20 resting between the flanges of lid 5 and base 3 in a lid such as lid 5.

Figure 2:
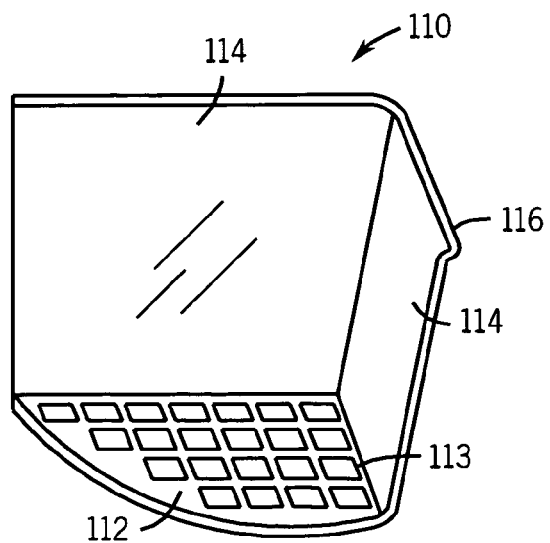
FIG. 2 is a front perspective view of another embodiment of the article of the present invention.

A seventh embodiment shown in FIG. 2 is referred to as article 110. Generally, this embodiment has a somewhat triangular platform 112 with at least two side walls 114 extending upwardly therefrom. Platform 112 may have an optional grid of openings 113 as shown. A flange 116 is located at the top of each side wall as in the previous embodiments. This embodiment is designed to fit into a corner of an animal housing, and may be enclosed with a third wall (not shown). If enclosed, an opening is provided in the third wall or in the platform for animal access to article 110. Alternatively, one or two of the triangular platforms may be used to replace the platform 10 in the first embodiment (not shown).

In any of the embodiments of the present invention, food cups or clips may be provided inside the articles. Preferably, the food is raised from the surfaces of base 3 or of platform so that the animal cannot defecate or urinate thereon.

While the articles of the present invention have been described and illustrated hereinabove with regard to specific embodiments, it should be understood that various modifications could be made to these embodiments without departing from the scope of the present invention. For example, the articles described above may be modified or combined to create new embodiments. Further, clips or hangars could be used to connect the articles to the housing instead of a flange, or the articles may be friction fit or formed integrally into a housing. The articles may hang from anywhere on a housing wall, not just from the top of a housing wall. It is also possible to place the article in a housing in an upsidedown position so that the flange (or the like) rests on the floor of the base or housing. In addition, the housing is not limited to a base with a removable lid. All of the above articles could be adapted for use in housings that front-load rather than top-load. Therefore, the present invention is not to be limited to these specific embodiments.

The invention claimed is:

1. An article for enriching the environment of a confined animal housed in a standard container having a floor and a base portion, wherein said container does not have a fixed lid, with the article comprising:
    (a) a platform providing a stable place on which said animal may perch without having to curl up, bend, or distort its natural postural position, and wherein said animal can selectively remove itself from said floor to said platform;
    (b) at least one wall having a first edge connected to said platform, said wall extending from said platform; and
    (c) a flange connected to said wall at a second edge of said wall opposite the platform, wherein the flange engages the container's base maintaining the article above the floor of the container, wherein the flange includes at least one aperture through which air or fluids may be directed in or out of the container.

2. An article according to claim 1 wherein the article is adapted to fit substantially entirely within the container.

3. An article according to claim 1 wherein said article is adapted to fit within the standard container without modification to said container.

4. An article according to claim 1 wherein the wall includes at least one boss thereby preventing said articles from sticking together during stacked storage of a plurality of said articles.

5. An article, according to claim 1 comprising more than one wall.

6. An article according to claim 5, wherein said walls are rigidly joined along their points of contact with each other.

7. An article according to claim 6 comprising four walls.

8. An article according to claim 7 wherein said four walls share the flange in common so that said flange extends substantially continuously and in a substantially unbroken manner for positioning within the container.

9. An article according to claim 1 comprising three walls.

10. An article according to claim 1 wherein the article further comprises a food or drink dispensing apparatus.

11. An article according to claim 1 wherein the platform includes at least one hole through which the confined animal may pass to perch on said platform.

12. An article according to claim 11 wherein said at least one hole in the platform is located at a periphery of said platform.

13. An article according to claim 1 wherein the platform is rectangular.

14. An article according to claim 1 at least partially formed from stainless steel, polycarbonate, ZYTEM™, polyethylene or combinations thereof.

15. An article according to claim 1 at least partially formed from a biodegradable material.

16. An article according to claim 1 at least partially formed from an autoclavable material.

17. An article according to claim 1 at least partially formed from a transparent material.

18. An article according to claim 1 wherein said article is of unitary construction.

19. An article for enriching the environment of a confined animal housed in a standard container having a floor and a base portion, wherein said container does not have a fixed lid, with the article comprising:
    (a) a platform providing a stable place on which said animal may perch without having to curl up, bend, or distort its natural postural position, and wherein said animal can selectively remove itself from said floor to said platform, wherein the platform is maintained in said container at a position above the height of a water spout provided on the container;
    (b) at least one wall having a first edge connected to said platform, said wall extending from said platform; and
    (c) a flange connected to said wall at a second edge of said wall opposite the platform, wherein the flange engages the container's base maintaining the article above the floor of the container.

20. An article for enriching the environment of a confined animal housed in a standard container having a floor and a base portion, wherein said container does not have a fixed lid, with the article comprising:
    (a) a platform providing a stable place on which said animal may perch without having to curl up, bend, or distort its natural postural position, and wherein said animal can selectively remove itself from said floor to said platform;
    (b) at least one wall having a first edge connected to said platform, said wall extending from said platform, wherein the said at least one wall includes at least one hole through which the confined animal may pass to reside on said platform; and
    (c) a flange connected to said wall at a second edge of said wall opposite the platform, wherein the flange engages the container's base maintaining the article above the floor of the container.

21. An article according to claim 20 wherein the at least one hole in the wall is located at a periphery of said wall.

22. An article for enriching the environment of a confined animal housed in a standard container having a floor and a base portion, wherein said container does not have a fixed lid, with the article comprising:
    (a) a platform providing a stable place on which said animal may perch without having to curl up, bend, or distort its natural postural position, and wherein said animal can selectively remove itself from said floor to said platform, wherein the platform includes a ridge member at least partially dividing the platform:
    (b) at least one wall having a first edge connected to said platform, said wall extending from said platform; and
    (c) a flange connected to said wall at a second edge of said wall opposite the platform, wherein the flange engages the container's base maintaining the article above the floor of the container.

23. An article according to claim 22 wherein the ridge member further includes a food or drinking apparatus.

24. A method for enhancing the environment of at least one animal confined within a container, comprising the steps of:
    (a) equipping said container with an article according to claim 1; and
    (b) subsequently placing the at least one animal in the container so that the at least one animal may move selectively to and from or perch on the article.

25. An article for enhancing the environment of animals that are kept in standard substantially non-wire cages having a base with top edges and floor comprising a substantially flat platform having at least one wall formed by the base of said cage wherein said platform is made integral with the base of said standard cage, and maintained above and substantially parallel to the floor of an animal's cage for providing a perch for one or more animals kept in said cage to permit said animals to selectively remove themselves from said floor, wherein said animals may dwell on said article without having to curl up, bend, or distort their natural postural position.

26. An article according to claim 25, wherein the bottom of said platform extends over an area equal to or greater than 25% of the floor of said cage.

27. An article according to claim 25, wherein said platform extends over an area equal to or greater than 50% of the floor of the cage.

28. An article according to claim 25 wherein said platform is maintained in place by suspending said platform from the top edges of said base of said cage.

29. An article for enhancing the environment of animals that are kept in standard substantially non-wire cages having a base with top edges and floor comprising a substantially flat platform having at least one wall formed by the base of said cage, and maintained above and substantially parallel to the floor of an animal's cage for providing a perch for one or more animals kept in said cage to permit said animals to selectively remove themselves from said floor, wherein said animals may dwell on said article without having to curl up, bend, or distort their natural postural position;
   wherein said cage further includes an outlet for means for dispensing liquid or gas and wherein said platform is positioned above said outlet to permit said animals to survive a flood in said cage caused by a failure of said means for dispensing liquid or gas.

30. A standard substantially non-wire cage having a base with top edges and floors, the improvement comprising a substantially flat platform made integral with the base of said standard cage, said platform being maintained above and substantially parallel to the floor of said base by suspending said platform from the top edges of said base of said cage, for providing a perch for one or more animals kept in said cage to permit said animals to selectively remove themselves from the floor of said cage wherein said animals may dwell on said perch at a position below the top edges of the cage and above the floor of the cage without having to curl up, bend, or distort its natural postural position.

31. An article according to claim 30, wherein the bottom of said platform extends over an area equal to or greater than 25% of the floor of said cage.

32. An article according to claim 30, wherein said platform extends over an area equal to or greater than 50% of the floor of the cage.

33. An article according to claim 30, wherein said platform has at least one wall.

34. A standard substantially non-wire cage having a base with top edges and floors, the improvement comprising a substantially flat platform maintained above and substantially parallel to the floor of said base by suspending said platform from the top edges of said base of said cage, for providing a perch for one or more animals kept in said cage to permit said animals to selectively remove themselves from the floor of said cage wherein said animals may dwell on said perch at a position below the top edges of the cage and above the floor of the cage without having to curl up, bend, or distort its natural postural position, wherein said platform has at least one wall formed by the base of said cage.

35. A standard substantially non-wire cage having a base with top edges and floors, the improvement comprising a substantially flat platform maintained above and substantially parallel to the floor of said base by suspending said platform from the top edges of said base of said cage, for providing a perch for one or more animals kept in said cage to permit said animals to selectively remove themselves from the floor of said cage wherein said animals may dwell on said perch at a position below the top edges of the cage and above the floor of the cage without having to curl up, bend, or distort its natural postural position,
   wherein said cage further includes an outlet for means for dispensing liquid and wherein said platform is positioned above said outlet to permit said animals to survive a flood in said cage caused by a failure of said means for dispensing liquid.

* * * * *